Figure 4:
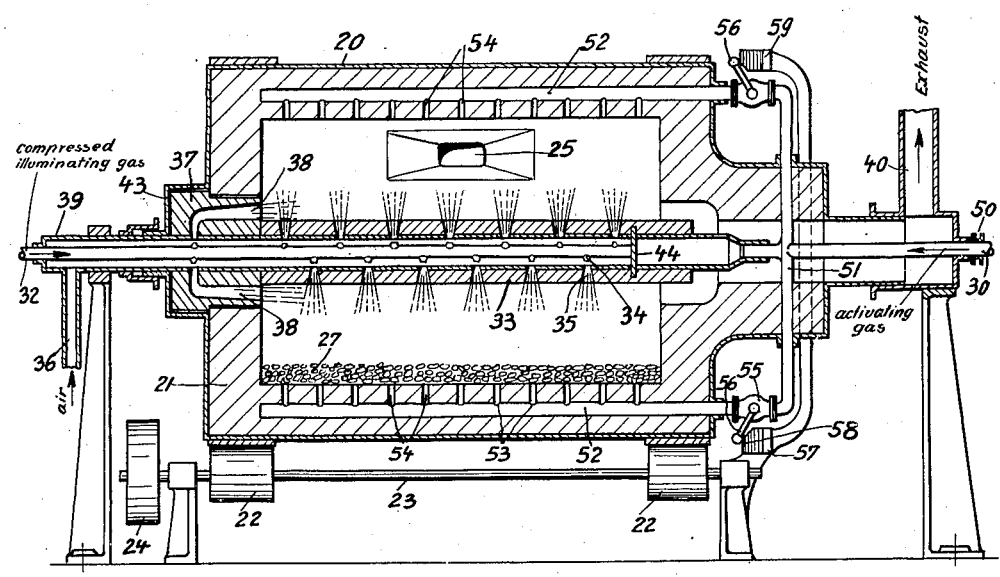

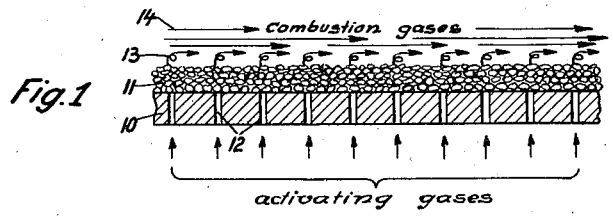
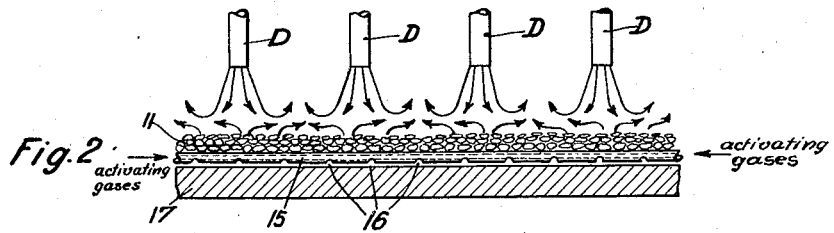
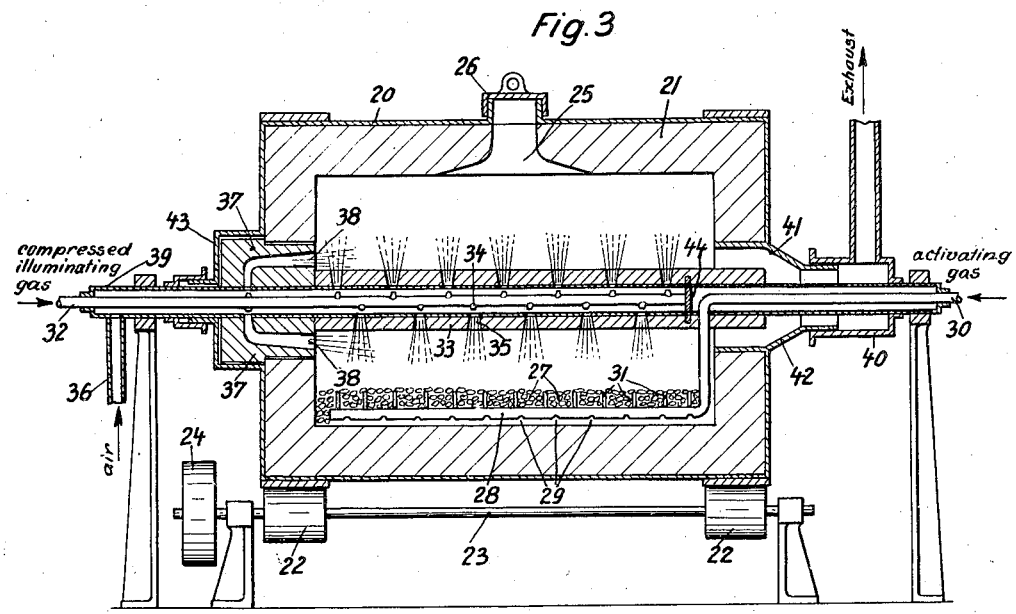

Patented Feb. 9, 1932

1,843,941

UNITED STATES PATENT OFFICE

OTTO BEGEROW, OF BAD KREUZNACH, AND OTTO FUCHS, OF KONSTANZ, GERMANY, ASSIGNORS, BY MESNE ASSIGNMENTS, TO THE FIRM OF DEUTSCHE GOLD- UND SILBER-SCHEIDEANSTALT VORMALS ROESSLER, OF FRANKFORT-ON-THE-MAIN, GERMANY, A CORPORATION OF GERMANY

PROCESS AND APPARATUS FOR ACTIVATING CARBONACEOUS MATERIAL

Application filed October 24, 1929, Serial No. 402,263, and in Germany April 20, 1929.

Our invention relates to a process of and an apparatus for activating carbonaceous material by treatment with certain gases at an elevated temperature.

As is well known, the activation of carbonaceous materials requires the use of high temperatures (from about 700° C. up) and this is particularly true in the process described in the United States patent to Otto Fuchs, No. 1,753,507, wherein the material is subjected for a short time only to very high temperatures (about 900°–1000° C.) in order to reduce the loss of material by oxidation. A mode of treatment whereby the necessary high temperatures can be economically obtained therefore offers important advantages.

The chemical reactions of the oxygen-containing activating gases, such as water vapors and carbon dioxide, with the carbonaceous material taking place during the process are accompanied by a considerable heat consumption which renders it difficult or impossible to maintain the required high temperatures by indirectly heating the material, for instance in the customary retorts, the walls of which are generally of chamotte and have a considerable thickness, usually about 2.5 inches. For this reason, the direct heating of the carbonaceous material is commonly preferred.

Prior to our invention, this direct heating was accomplished by methods in which the material was treated with a mixture of the heating gases, with the activating gases or in which the combustion gases were directly used as activating gases.

We have found that a better product and a larger output may be obtained in a highly economical manner by conducting the heating gases at a certain distance from the material so that they will heat the same solely by radiation and convection without, however, coming into direct contact therewith. At the same time, the concentrated activating gas unmixed with combustion gases, such as pure water vapor or a gas mixture containing at least 30 per cent carbon dioxide, is conducted through the material.

In practice, we may arrange the material in a layer and convey the activating gases transversely therethrough so that they issue at one side of the layer. At the same time, we conduct highly heated combustion gases over the same side to heat the same by radiation and convection, the activating gases issuing from the layer preventing the combustion gases from contacting with the material, if the flow speeds of the activating gases and of the combustion gases are properly correlated. Thus, the activating gases form, as it were, a protective cushion on the surface of the layer. The mechanical effect of this cushion is supported by the chemical effect of the activating gases which, in the course of their passage through the red-hot carbonaceous material, are partly converted to hydrogen or carbon monoxide or a mixture of both and, being combustible themselves, consume any free oxygen which may be present in the combustion gases and which may otherwise act on the material.

It will be appreciated that our process affords the further advantage of causing combustion of the generated hydrogen and carbon monoxide immediately above the layer of the material, which is thus very intensely heated by the flame near its upper surface.

From the foregoing it will be clear that our invention combines in a superior way the advantages of directly heating the material by radiation and convection with the benefits resulting from keeping separate the oxygen-containing combustion gases and the carbonaceous material.

Preferably, the material is spread on a supporting surface to form a layer and is moderately agitated during the activating process to expose all of the particles in succession to the heating action. When heated, the particles will thus be returned to the interior of the layer where they are subjected to activating gases of a high concentration.

Care should be taken in the operation of our process that the agitation is not too vigorous as the particles should remain on their supporting face and should not be kept in a state of suspension or hurled into the stream of combustion gases lest they be carried away by these gases and burned by the oxygen contained therein.

We have found that, preferably, the material to be activated is not only subjected to the stirring action of agitators moving within the material, but is stirred by such movement of its refractory support as will cause it to tumble down an inclined surface. For this purpose, the support may be constituted by a cylinder having a circular or polygonal profile and a substantially horizontal axis, and the material may be spread in the cylinder to cover a bottom section of the interior circumferential face thereof and to be agitated by a slow revolution or a moderate oscillation of the cylinder about its axis. In addition, agitators which do not participate in the rotation or oscillating movement but are stationary or move in opposite sense may be arranged within the cylinder.

In order to cause the activating gas to traverse the layer from below, the refractory lining of the cylinder may be provided with admission cavities, or separate conduits in the form of pipes or the like may be arranged within the cylinder or drum closely above its interior face. A simple and efficient arrangement consists in a plurality of pipes arranged parallel to the axis of the cylinder on the interior face thereof and connected to a common axially arranged supply pipe. The individual pipes are provided with ports distributing the activating gases over the layer, the ports being so arranged as to cause the gas to traverse the material from below and to be protected at the same time from being clogged by the particles of the material. Alternatively, the pipes may be situated within the refractory lining of the cylinder so as to be protected from the destructive effect of the high temperature. If, however, the pipes are arranged above the interior face of the cylinder to be freely movable relatively to the same, they may be equipped with finger-like projections acting as agitators. In this arrangement, the cooling of the pipes necessary to avoid rapid destruction by the intense heat will depend on the cooling effect of the flow of the activating gases.

It will be understood that the invention is in no way limited to the use of a specific carbonaceous material or a specific activating gas. The material, for instance, may be of the kind which has been impregnated with suitable chemicals which may be removed upon complete activation by a suitable washing process, if desired.

The manner in which our invention may be carried out will be more fully explained in the description hereinafter, reference being had to the accompanying drawings in which some preferred embodiments of our novel apparatus are illustrated. In said drawings, Figs. 1 and 2 are diagrammatic representations illustrating the principle of our invention;

Fig. 3 shows an axial section through a preferred form of the apparatus embodying the principle of Fig. 2, and Fig. 4 is an axial section through another embodiment of the invention.

With reference to Fig. 1, 10 represents a support on which the material to be treated is spread to form a thin layer 11. The activating gases, such as steam, or a gas mixture containing at least 30 per cent carbon dioxide, are conducted through conduits 12 provided in the support, and after transversing, the layer 11, issue from the upper side thereof, as diagrammatically indicated at 13. Simultaneously, highly heated combustion gases are passed over the layer, as indicated by the arrows 14, to heat the same by radiation and convection through the moving layer of gases issuing at 13. Thus, it will be seen, that the activating gases rising from the layer of material will act as a protective cushion precluding contact of the combustion gases 14 with the carbonaceous material 11. It will be evident that to produce the protective cushion of activating gases, it is not absolutely essential, although it is preferred, that such gases be caused to pass transversely through the layer of carbonaceous material as such cushion may also be secured by causing the activating gases to flow along the surface of the carbonaceous material (the latter being preferably agitated), there being thus likewise formed a protecting layer of activating gases between the carbonaceous material and the combustion gases.

Preferably, the combustion producing the highly heated gases is carried out immediately over the spread material. To this end, burners D may be arranged as shown in Fig. 2 to direct their flames downwardly toward the layer 11 to thereby intensely heat the same. Care must be taken, of course, to arrange the burners at a sufficient distance from the layer 11 to avoid immediate contact of the material with the flames or the combustion gases, as the same invariably contain free oxygen which would burn the activated material.

While in the embodiment shown in Fig. 1, the gas is admitted to the layer through ports provided in the supporting surface, in Fig. 2, a different arrangement is illustrated in which the activating gas is conducted through a plurality of conduits formed by pipes 15 extending closely above the supporting surface and through the carbonaceous material.

Each pipe has downwardly facing ports 16 from which the activating gas is discharged to be evenly distributed throughout the layer. In order to moderately agitate the material, the refractory support 17 may be given a reciprocatory or similar movement relative to the pipes 15 whereby the latter will act as agitators.

In Fig. 3 we have illustrated an embodiment incorporating the principles illustrated in Fig. 2. This apparatus, which is designed for the production of a large output, comprises a drum 20 of sheet-metal equipped with a refractory lining 21 and rests on two pairs of frictional rolls 22, one of each pair being visible in the drawing. The rolls are mounted on shafts 23 driven in any suitable manner, for instance from pulleys 24. Thus, a slow rotation in one direction or reciprocatory turns may be imparted to the drum, as desired. The drum is provided with an opening 25 sealed by a threaded cover 26 and serving as a charging opening in the position illustrated or as a discharging port when the drum is rotated through 180°.

The material to be activated is spread in the drum to form a thin layer 27 through which activating gas is conducted by means of pipes 28 arranged closely above the bottom section of the drum and provided with outlet openings 29. The pipes 28 form branches of a co-axially arranged admission pipe 30 connected to a suitable source of activating gas (not shown).

By means to be described hereinafter, the pipes 28 are kept stationary while the drum is given a rotary motion, preferably in a uniform direction. Thus, the material is carried along and raised on the wall of the drum until the particles tumble down and over each other and are thus thoroughly agitated without, however, being hurled into the heating gases. The agitating effect may be improved by finger-like projections 31 on the pipes 28.

The transverse section of the drum-chamber is preferably circular to avoid a grinding effect on the material, the radius of the drum being comparatively large.

The heating gases may be introduced into the drum, particularly when the axial dimension of the latter is small, through one or several ports provided in an end wall, the passages in the refractory lining of such wall being shaped to act as burners. When the length of the drum-chamber is large in comparison with its diameter so that it cannot be uniformly heated from the one end wall of the drum, we prefer to arrange the burners within the drum and distributed along the axis thereof. The combustible gases may be conducted into the interior of the drum separately from the combustion air so as to prevent mixture and combustion until after the gas has been fed into the interior of the drum, preferably near the drum axis. Whatever the specific construction the burners or admission ports for the heating gases are to be so arranged that the combustion gases, or flames respectively, do not penetrate the activating gases issuing from the layer of carbonaceous material, so that they do not come into contact with and burn the material.

The combustion gases and the exhausted activating gases are withdrawn through an exhaust port preferably situated in the opposite end wall of the drum, the caloric content of the exhaust gases being recovered for steam generation, or for preheating the heating gases or the activating gases, or for similar purposes by means of well known apparatus.

In the embodiment shown in Fig. 3 compressed illuminating gas is admitted through a tube 32 axially traversing the drum and surrounded by a second tube 33 of refractory material. Both tubes are provided with registering nozzle openings 34, or 35 respectively, so that the gas jet issuing from the nozzles 34 sucks air from the space between both tubes 32 and 33 to which space the air is supplied through a tube 36. Thus, the ports 35 constitute longitudinal distributed burners wherefrom flames are discharged in all directions. In addition to the burners 35 in the tube 33, the refractory lining 37 of the end wall is provided with burners 38.

The axial portion of the apparatus, comprising a sheet-metal pipe 39 on which the refractory tube 33 is mounted, the aforementioned block 37 of refractory material constituting part of the end-wall of the drum, the pipe 30 attached to and carried by the pipe 39, and an outlet box 40 of sheet-metal likewise attached to the pipe 39, is kept stationary while the drum revolves on its roller supports 22.

The exhaust gases are withdrawn from the drum through a passage 41 formed by a conical extension 42 of the sheet-metal sheath of the drum which engages the outlet box 40, a stuffing box being provided between both parts to prevent leakage. A similar stuffing box is arranged between the left-hand end of pipe 39 and an extension 43 of the drum-mantle which covers the block 37. A partition plate 44 supports the free end of pipe 32 and, at the same time, closes the air admission passage.

The operation is as follows: The drum is heated to about 800 to 850° C. and is then charged with 200 kg. charcoal made, for example, from beechwood, comminuted to give the chips a size of 5 to 10 millimeters. After the charging of the drum, the activating gas, for instance gas containing a high percentage of carbon dioxide such as results from wood carbonization, is admitted at a rate of about 150 cubic meters an hour and the temperature is further raised until the charge is heated to 900 to 950° C. The temperature is maintained at this point for 40 minutes to two hours, preferably one hour, depending on the quality of the material. Then the gas supplies are cut off and the material is allowed to cool for subsequent discharge.

The yield to our novel method amounts to 30 to 35 per cent of the charcoal and results in an activated charcoal of excellent properties.

In Fig. 4 we have shown a similar apparatus embodying the principles illustrated in Fig. 1. As in this embodiment the heating gases are admitted in substantially the same manner as in Fig. 3, the description of the burners need not be repeated, the same reference numerals being used as in Fig. 3. The point of difference resides in the means for distributing the activating gases over the layer 27 of carbonaceous material. The admission pipe 30 is not stationary but rotates in unison with the drum and extends through a stuffing box 50 of the outlet box 40. Through branch pipes 51 the admission pipe 30 is connected to a multiplicity of conduits 52 which are circumferentially distributed over the drum and embedded in its refractory lining and are each equipped with a plurality of ports 53 communicating with the interior of the drum through radial passages 54. In each of the branch pipes 51 is inserted a spring-controlled valve 55 which is normally closed but may be opened by swinging an operating lever 56 to the left as viewed in Fig. 4.

As the drum revolves, the levers 56 of the valves 55 engage a stationary cam segment 57 and ride upon its cam face 58 whereby the valves are opened until, in the course of their revolution, they leave the cam segment 57 again and are restored to their normal position by suitable springs (not shown). The cam segment 57 is so arranged as to open the conduits 52 while they pass below the layer 27. A similar cam 59 temporarily opens the valves while their conduits pass through their upper positions to send a short jet of activating gases through the same and through the passages 54 whereby the same are blown free from charcoal particles.

What we claim is:—

1. A process of activating carbonaceous material, comprising spreading said material on a supporting surface, conveying activating gases transversely to said surface through the spread material, and conducting combustion gases over the latter to heat it by radiation and convection.

2. A process of activating carbonaceous material, comprising arranging the material in a layer, conveying activating gases transversely through said layer so as to cause them to issue from one side thereof, and simultaneously conducting combustion gases over said layer so as to heat said side of the layer by radiation and convection through the activating gases issuing from said side, and moderately agitating the material during the steps set forth.

3. A process of activating carbonaceous material, comprising arranging the material in a layer, conveying activating gases transversely through said layer so as to cause them to issue from one side thereof, and simultaneously burning combustible gases in front of and at a distance from said side, said activating gases issuing from said layer precluding contact of the products of combustion from said combustible gases with said material.

4. A process of activating carbonaceous material, comprising arranging the material in a layer, conveying activating gases transversely through said layer so as to cause them to issue from the one side thereof, simultaneously burning combustible gases in front of and at a distance from said side, said activating gases issuing from said layer precluding contact of the products of combustion of said combustible gases with said material, and moderately agitating the material during the steps set forth.

5. A method of activating carbonaceous material comprising causing the material to tumble down an inclined surface, conveying activating gases through the material from and transversely to said surface, and simultaneously conducting combustion gases over said material to heat the same by radiation and convection through the intervening layer of activating gases issuing from said material, whereby direct contact of the latter with said combustion gases is prevented.

6. Apparatus for activating carbonaceous material comprising a substantialy horizontal drum adapted to receive a layer of said material upon a bottom section of its interior surface, conduits leading to said bottom section of the drum to conduct activating gases through said layer, and means for conducting combustion gases into the interior of said drum.

7. Apparatus for activating carbonaceous material comprising a substantially horizontal drum adapted to receive a layer of said material upon a bottom section of its interior surface, conduits leading to said bottom section of the drum to conduct activating gases through said layer, and burners opening into the interior of said drum.

8. Apparatus for activating carbonaceous material comprising a substantially horizontal drum adapted to receive a layer of said material upon a bottom section of its interior surface, conduits leading to said bottom section of the drum to conduct activating gases through said layer, and downwardly directed burners in said drum longitudinally distributed over said bottom section.

9. Apparatus for activating carbonaceous material comprising a movable support adapted to receive a layer of said material, conduits associated with said support to conduct activating gases through said layer and downwardly directed burners over said support.

10. Apparatus for activating carbonaceous material comprising a substantialy horizontal drum adapted to receive a layer of said material upon a bottom section of its interior surface, conduits leading to said bottom section of the drum to distribute and conduct activating gases through said layer, burners receiving their supply through one end face of said drum and discharging into the interior of the latter, and an outlet for combustion gases in the other end face of the drum.

11. Apparatus for activating carbonaceous material, comprising a substantially horizontal drum, conduits leading to a bottom section of the interior surface of the drum to conduct activating gases through a layer of said material upon said section, a tube axially traversing said drum and adapted to be connected to a source of a combustible gas, and nozzle openings in said tube directed toward said section.

12. Apparatus for activating carbonaceous material, comprising a substantially horizontal revoluble drum provided with conduits having a multiplicity of outlet openings distributed both circumferentially and longitudinally over the inner face of said drum, an admission pipe for an activating gas connected to said conduits, valves in said conduits controlled to admit activating gas to those of said outlet openings which pass through their lower position in the course of the revolution of said drum, and burners discharging into the interior of said drum.

13. Apparatus for activating carbonaceous material, comprising a substantially horizontal revoluble drum provided with circumferentially distributed axial conduits, each conduit having a plurality of ports opening into the interior of said drum, an admission pipe for an activating gas connected to said conduits, valves individually coordinated to said conduits, means to open said valves while their coordinated conduits pass through their lower positions in the course of the revolution of said drum, and to temporerily open said valves when their conduits are in their upper position, and burners discharging into the interior of said drum.

14. Apparatus for activating carbonaceous material, comprising a substantially horizontal revoluble drum provided with circumferentially distributed axial conduits, each conduit having a plurality of ports opening into the interior of said drum, an admission pipe for an activating gas connected to said conduits, valves individually coordinated to said conduits, means to open said valves while their coordinated conduits pass through their lower positions in the course of the revolution of said drum and to temporarily open said valves when their conduits are in their upper position, a tube axially traversing said drum and adapted to be connected to a source of a combustible gas, and a second tube surrounding the first-mentioned tube in spaced relation and connected to an air supply, said tubes being provided with registering nozzle openings.

15. A process of activating carbonaceous material, which comprises conveying activating gases to the surface of a layer of such material, and conducting hot combustion gases above such surface in such manner that the material is heated by the combustion gases by radiation and convection and is protected against oxidation thereby by the intervening layer of activating gases.

16. Apparatus for activating carbonaceous material, comprising a support adapted to receive a layer of such material, a conduit leading to said support and arranged to discharge activating gases against said layer of material, and means for introducing a current of hot combustion gases above said layer, said means arranged to discharge such combustion gases out of contact with said material and at such a distance therefrom that the material is heated by said combustion gases substantially only by radiation and convection through an intervening layer of activating gases.

OTTO BEGEROW.
OTTO FUCHS.